United States Patent [19]
McCue

[11] Patent Number: 6,076,104
[45] Date of Patent: Jun. 13, 2000

[54] VIDEO DATA INTEGRATION SYSTEM USING IMAGE DATA AND ASSOCIATED HYPERTEXT LINKS

[75] Inventor: Michael McCue, Los Gatos, Calif.

[73] Assignee: Netscape Communications Corp., Mountain View, Calif.

[21] Appl. No.: 08/923,660

[22] Filed: Sep. 4, 1997

[51] Int. Cl.[7] ................................................ G06F 15/16
[52] U.S. Cl. .......................... 709/219; 345/327; 345/335; 709/217
[58] Field of Search .................................... 709/217, 219, 709/238, 247; 707/513, 902; 345/302, 327, 335, 473, 475

[56] References Cited

U.S. PATENT DOCUMENTS

| | | | |
|---|---|---|---|
| 5,708,826 | 1/1998 | Ikeda et al. | 707/513 |
| 5,745,642 | 4/1998 | Ahn | 707/104 |
| 5,764,241 | 6/1998 | Elliott et al. | 707/501 |
| 5,774,666 | 6/1998 | Portuesi | 709/219 |
| 5,778,181 | 7/1998 | Hidary et al. | 709/219 |
| 5,819,301 | 10/1998 | Rowe et al. | 707/513 |
| 5,819,302 | 10/1998 | Nielsen | 707/902 |
| 5,838,917 | 11/1998 | Paolini | 709/219 |
| 5,841,978 | 11/1998 | Rhoads | 709/217 |
| 5,880,740 | 3/1999 | Halliday et al. | 345/435 |

OTHER PUBLICATIONS

Absolute–positioning and layering in HTML Using Style Sheets.
Layers and JavaScript Extensions for Layers Glossary.

*Primary Examiner*—Mark H. Rinehart
*Assistant Examiner*—Marc D. Thompson
*Attorney, Agent, or Firm*—Limbach & Limbach L.L.P.; Seong-Kun Oh

[57] ABSTRACT

Dynamic video images are integrated with HTML text in web browsers to provide links to other predetermined locations containing information (web pages or information in other formats) by selecting a feature of a dynamic video image, storing an image map file, generating a unique feature specific to the selected dynamic video image (such as color intensity, text data, audio data, or layer information) and correlating the detail information to the image map file.

22 Claims, 3 Drawing Sheets

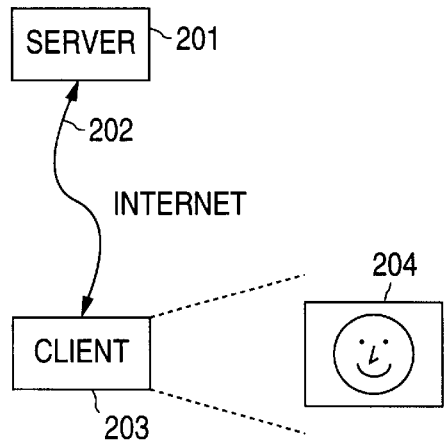
FIG. 2
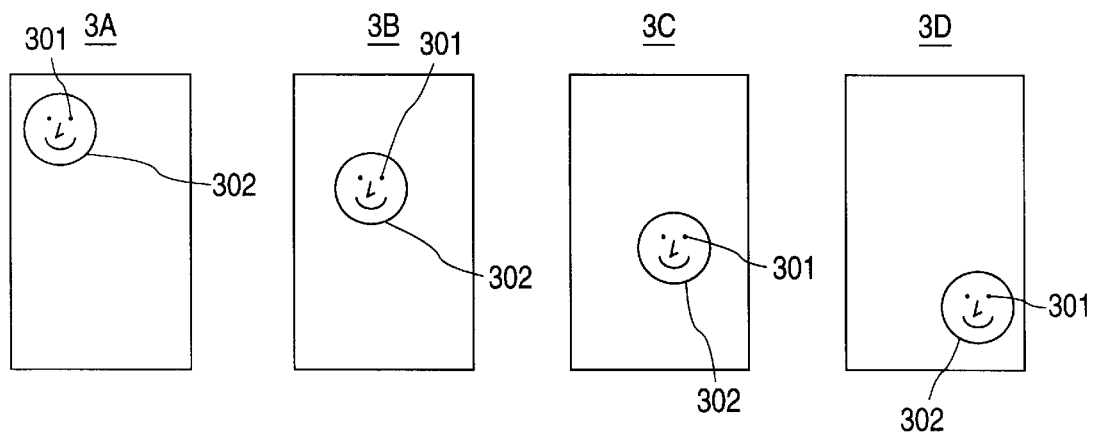
FIG. 3A  FIG. 3B  FIG. 3C  FIG. 3D

VIDEO DATA INTEGRATION SYSTEM USING IMAGE DATA AND ASSOCIATED HYPERTEXT LINKS

BACKGROUND OF THE INVENTION

1. Field of the Invention

The present invention relates to image mapping in browser software. More particularly, the present invention relates to a method and apparatus for integrating dynamic video images with Hypertext Markup Language ("HTML") data.

2. Description of the Related Art

Data transmission over the internet is increasingly more prevalent. In particular, transmission of still image data over the internet has been on a sharp rise over the past few years. Generally, such images are produced by scanning a "hard" copy of the image into electronic form with a conventional scanner, or they are generated from a computer terminal using conventional graphics programs.

When an image is transmitted over the internet from a server computer to a client computer, conventional internet world wide web ("web") publishing software provides facilities for configuring an image map for a user to define a specific region of the image to which a Uniform Resource Locator ("URL") can be attached. The URL to the specific image region in turn allows the user, through the web browser to link, or otherwise jump to that internet location ("web site") generally containing more information related to the specific portion of the image data to which the URL is attached. In effect, the image region acts as a "button" that links a user, upon selection of that image region, to a URL that is linked to that image region.

As previously discussed, an image can be subdivided into distinct regions which are further configured such that each distinct region is linked to a different document.

Two conventional methods of implementing image maps employing either a server-side image map or client-side image map exist.

With server-side image maps, when the user selects an image region that has been mapped, the browser sends the x,y coordinates of the selection (for example, a mouse pointer location) to a script executing on the server computer.

With client-side image maps (for example, supported by browsers such as Netscape Navigator Versions 2.0 and 3.0), the association of links with specific regions in an image is handled by the browser itself executing on the client computer rather than by a server script. This enables a web publisher to include image maps in a desired Hypertext Markup Language ("HTML"), a computer language that enables interpretation and presentation of text as well as multimedia-based information among computer networks. Similar to server-side image maps, pixel coordinates are assigned URL addresses in client-side image maps.

Additionally, combined client/server image map software may be provided that handles client-side image maps, but automatically switches to server-side image maps if a particular browser does not support client-side image maps.

FIG. 1 shows a conventional still image retrievable by a web browser. As shown, a still image 106 is divided into four segments (shown by the dotted lines). The portion of the still image 106 that falls within each of the corresponding one of four segments can be identified by the various coordinates 101, 102, 103 and 104 corresponding to each of the four segments of the image. Each of the four coordinates 101, 102, 103 and 104 combined with a shared coordinate 105 are collectively stored in a map file. Then, a portion of the map file corresponding to each of the four image segments is configured to correspond to a unique URL, whereby selection by the user of an image region (by clicking on any of the four segments of the still image) causes the display to change to a new location linked to the URL pointed to by the portion of the map file that corresponds to the selected image region.

The above described approach is limited to image mapping of a still, static image. On the other hand, image transmission over the internet has rapidly moved from transmission and reception of still images to transmission and reception of dynamic, video images or programs for live, real-time display and/or non-live, pre-stored display.

In view of the foregoing, it would be desirable to have a method of mapping dynamic video images or programs including live, non-live, real-time, or pre-stored video images or programs to support URL address links.

SUMMARY OF THE INVENTION

The present invention is directed to providing an apparatus and method to integrate dynamic video images with text data in a web browser, such that each dynamic video image (or a segment thereof) has a predetermined URL attached thereto within the display of a browser. In accordance with the present invention, selection of a specific feature of a dynamic video image, irrespective of where the feature is located on the display at the time of selection, links the user to the predetermined site to which the URL corresponding to the feature is attached.

A system for displaying dynamic video images in accordance with one embodiment of the present invention includes a browser for selecting a feature of a dynamic video image and in accordance thereto displaying data from a URL location; a frame file having a plurality of frame locations, each frame location for storing individual frames of the dynamic video image wherein each frame shares the feature; and an image map file having a plurality of image map locations; wherein each image map location stores an image map corresponding to individual frame locations and each of the image maps for each frame shares the URL location; and wherein the browser displays the data from the URL location corresponding to the feature of said dynamic video image in response to the image map.

A system for displaying dynamic video images in accordance with another embodiment of the present invention includes a server for receiving an indication of a feature of a dynamic video image; a frame file having a plurality of locations, each frame location for storing individual frames of the dynamic video image wherein each frame shares the feature; and an image map file having a plurality of image map locations; wherein each image map location stores an image map corresponding to each individual frames and wherein each of the image map for each frame shares the URL location.

Additionally, the image map file in accordance with yet another embodiment of the present invention is compressed.

Additionally, an apparatus for integrating dynamic video image for use in web browser applications in accordance with another embodiment of the present invention includes selecting means for selecting a dynamic video image; storage means for storing an image map file; generating means for generating a detail information in accordance with the dynamic video image; and correlating means for correlating the detail information to the image map file.

A method of displaying dynamic video images in accordance with one embodiment of the present invention includes the steps of: selecting a feature of a dynamic video image and in accordance thereto displaying data from a URL location; individually storing each frame of the dynamic video image wherein each frame shares the feature; individually storing image maps corresponding to each of the individual frames wherein each image map shares the URL location; and displaying the data from the URL location corresponding to the feature of the dynamic video image.

Furthermore, in accordance with another embodiment of the present invention, the step of storing an image map file includes the step of compressing the image map file.

Yet another method of integrating dynamic video image in web browser applications in accordance with the present invention includes the steps of: selecting a dynamic video image; storing an image map file; generating a detail information in accordance with the dynamic video image; and correlating the detail information to the image map file.

These and other features and advantages of the present invention will be understood upon consideration of the following detailed description of the invention and the accompanying drawings.

BRIEF DESCRIPTION OF THE DRAWINGS

FIG. 2 illustrates the client-server interconnection over the internet in accordance with an embodiment of the present invention.

FIGS. 3A–3D illustrate a series of dynamic video images according to an embodiment of the present invention.

DETAILED DESCRIPTION

Figure 1:
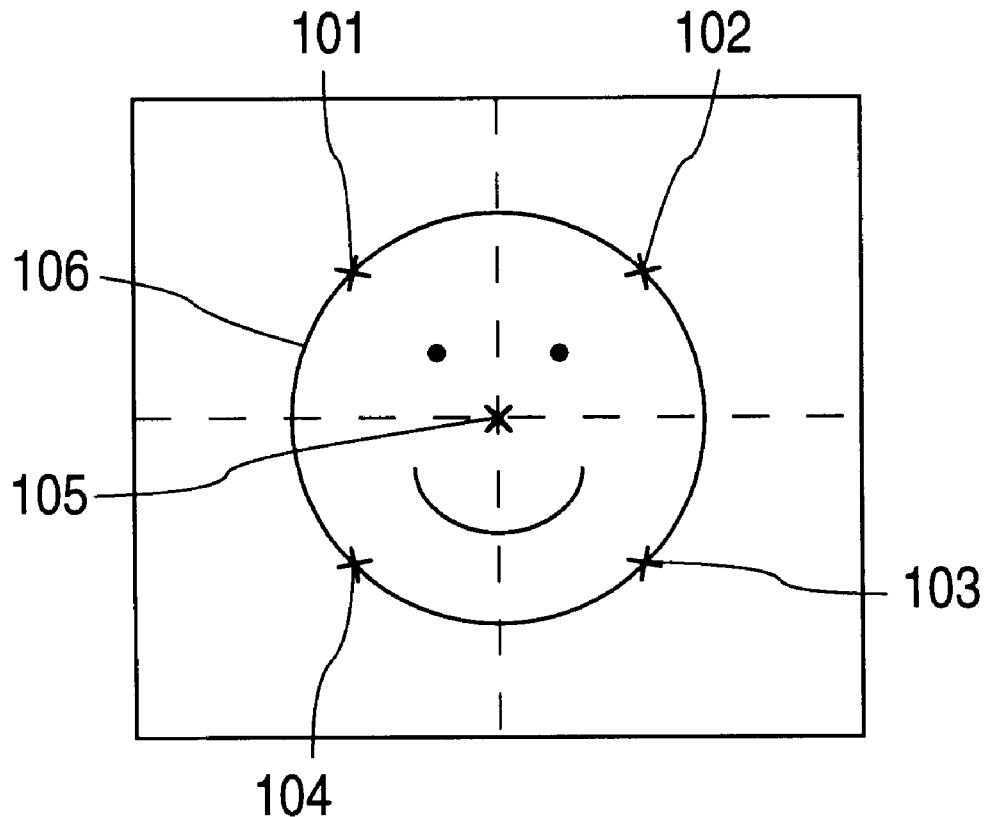
FIG. 1 illustrates a conventional still image divided into image regions.

FIG. 2 illustrates a dynamic video image integration system in accordance with one embodiment of the present invention. As shown, a server computer 201 is coupled to a client computer 203 over a network 202 which may be LAN, internet, ethernet, or other equivalent network. The client computer 203, in turn, has a display screen 204 such as Liquid Crystal Display ("LCD"), Cathode Ray Tube ("CRT"), or any other equivalent display means. The display screen displays a dynamic video image in accordance with the present invention, as illustrated in FIGS. 3A–3D.

FIGS. 3A–3D show a representation over time of a dynamic video image. As shown, frames of a dynamic video image 302 are configured to be displayed in accordance with the configuration of the video program. In this regard, the video image 302 may comprise a character in television show or a user-generated video graphics program where images are animated. Moreover, the video program including numerous dynamic video images can include, for example, a pre-stored video program, live news broadcast, or a sports event such as a baseball game. This list, however, is not exhaustive, and many other possibilities exist for dynamic video images and programs.

As shown, while the frames of image 302 are displayed on the display screen, a feature of the moving image 302 appears in each frame of the dynamic video image. Such a feature can include unique color combination of a person's left eye 301 which does not vary while the dynamic video image 302 is in motion, i.e., from FIG. 3A to FIG. 3D. In accordance with one embodiment of the invention, a video image map file is configured to correspond to the dynamic video image 302 such that a URL is attached to a feature of the dynamic video image 302. The unique feature of the image as discussed above can also include audio information specific and unique to the image (such as the frequency of the audio data attributed to the image) as well as database output.

In this manner, in accordance with the present invention, features of a dynamic, moving video image in a video program or the like can be mapped to support URL address links irrespective of in which frames or which location in those frames the feature is displayed. In particular, a user viewing the dynamic video image 302 may select any part of the image (e.g., the face as shown), irrespective of the image frame, that is mapped to a URL regardless of whether the feature when selected is located substantially to the upper left corner of the display screen (FIG. 3A), towards the middle of the screen (FIG. 3B), more to the lower half of the display screen (FIG. 3C), or substantially to the bottom right corner of the screen (FIG. 3D). In other words, irrespective of the frame location of the feature (face) on the display during the reproduction of the dynamic video image 302, when the user selects the face of the dynamic video image 302, the browser will display data from a location to which the URL of the video image is correlated or linked. Also, rather than retrieving the data directly from the URL, the browser may retrieve the data from a cache or a proxy server. The configuration of the dynamic video image and the correlation of the corresponding URL in accordance with the selection of the dynamic video image is now described.

Figure 4:
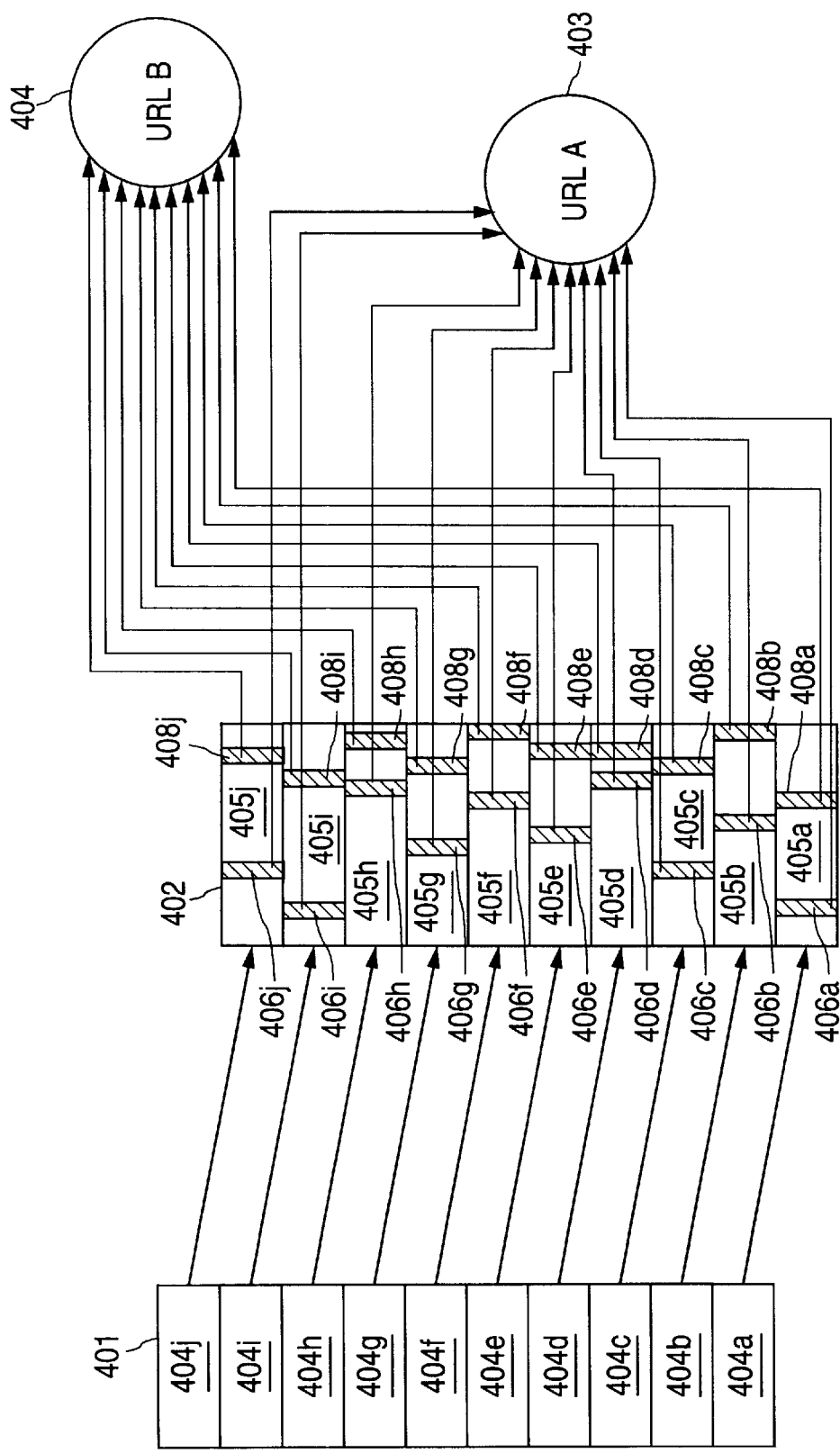
FIG. 4 illustrates a dynamic video image frame file and a corresponding video image map file linked to a common URL.

FIG. 4 shows a frame file 401, an image map file 402 and URLs 403 and 404. In accordance with one embodiment of the present invention, the frame file 401 is divided into a plurality of locations 404a, 404b, 404c, 404d, and so on for storing information of each respective frame of the dynamic video image. The image map file 402 is likewise divided into a plurality of locations 405a, 405b, 405c, 405d, and so on for storing image maps that correspond to each of the frames of the dynamic video image stored individually in each of the frame locations 404a, 404b, 404c, 404d and so on, respectively. Moreover, the image map files may be in compressed form, in which case, decompression techniques as known in the art can be applied to retrieve the image map files to decompress the compressed image map files.

The frame information for each frame of the dynamic video image stored in the frame file 401 differs from one another, since the features of the image are continuously moving about the display. Likewise, the image map information for each frame stored in the image map file 402 varies. This can be seen by the varying locations of the pointers 406a, 406b, 406c, 406d, and so on to URL 403 within each image map locations 405a, 405b, 405c, 405d, and so on in the image map file 402.

In the manner described above, the image map file 402 is configured to store the mapping information corresponding to the frames of the dynamic video image stored in the frame file 401. The mapping information can be pre-configured according to the specific and particular features of the dynamic video image.

Then, irrespective of which segment of the dynamic video image is selected, mapping information in the various image map locations 405a, 405b, 405c, 405d, and so on within the image map file 402 is correlated such that the selected feature is linked to the predetermined URL 403 regardless of when (which frame of display) the dynamic video image is selected.

For example, frame information of a video program featuring a bald eagle flying across the sky can be stored in the frame file 401. The particular detail of the eagle is then stored as the video image map file corresponding to the eagle itself in the image map file 402. Such particular detail of the eagle can include, but not limited to, the color intensity of the eagle's eyes, the specific shape of the eagle's beak, all of which will not vary throughout the video program even though the eagle is in continuous movement.

Moreover, in accordance with the present invention, the detail information can also include, in addition to the aforementioned color intensity, other features uniquely related to the dynamic video image including text information as well as layer information. Further information relating to layers is disclosed in the Hypertext Markup Language file which can be found at: http://search.netscape.com/comprod/products/communica tor/lavers/lavers glossary.html, the content of which is incorporated herein by reference. Briefly, a layer is a container which can be used, for example, to group HTML document elements, specify the X-Y pixel position of the group and its layering, or stacking order. Using layer information that is specific and unique to a particular video image, dynamic video images can be created using HTML and a scripting language such as JavaScript.

Using the example of the video program featuring the bald eagle, in accordance with the present invention, each frame stored in the frame file 401 is configured such that it corresponds to a specific video image map in the image map file 402. In turn, each video image map stored in the image map file 402 has a portion that is linked to a URL (for instance, URL 403) for the National Audubon Society. Then, upon selecting the eagle during the reproduction of the video program, such as by clicking onto a part of the eagle, the browser will retrieve the data from the web page of the National Audubon Society and the browser will display information from that location.

The selection of a particular feature of a dynamic video image can be accomplished by the user. This can be accomplished by using a mouse, a keyboard, or any other input control device. Alternatively, for systems having touch-pad screens, the user may select the feature of the desired dynamic video image on display during the course of the video program simply by touching the specific portion of the touch-sensitive screen where the feature is displayed. Then, as before, the corresponding URL of the video image segment on the display where the user touched will link the user's display to that specific location.

In accordance with further embodiments of the present invention, feature information of a plurality of specific portions of the dynamic video image for each frame of the dynamic video image is stored. In other words, the frame file is further divided to store the feature information of a second feature portion of the dynamic video image in locations 404a, 404b, 404c, 404d and 404e. In turn, the locations 405a, 405b, 405c, 405d, and 405e of image map file 402 further include a plurality of locations 408a, 408b, 408c, 408d, and 408e for storing a URL (i.e., URL B) that correspond to the second feature of the dynamic video image stored in each of the frame locations 404a, 404b, 404c, 404d and 404e, respectively.

In this manner, several features of the same dynamic video image can be used to provide separate links to separate locations or web sites.

The video program displaying dynamic video images can be received live, in real-time either in compressed or uncompressed form, from a network terminal node or processor. Alternatively, in accordance with another embodiment of the present invention, the network terminal node or processor can include input means which may be a video camera, a video cassette recorder (VCR) which is selected to play or generate a pre-programmed video segment, in part or in whole.

As illustrated above, the present invention allows flexible integration of dynamic video images on display with other information that can be linked with a URL. In this manner, the browser is capable of offering a very adaptable dynamic display of video information. This approach offers significant advantages over still image display having URL links, as the video display is not limited to still, frame-by-frame video image display.

Additionally, according to the present invention, powerful HTML documents can be created incorporating dynamic video, audio, text data, and layering of the text data and/or graphics providing web browsers with animated display of information that is fully integrated and particularly suited to high level multimedia operation.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A system that displays dynamic video images, the dynamic video images including a plurality of frames, comprising:

a browser including means for a user to select a feature of a frame of a dynamic video image;

a frame file having a plurality of frame locations, each frame location for storing one of the frames of said dynamic video image, wherein each individual frame includes the selected feature; and an image map file having a plurality of image map locations;

wherein each image map location is for storing an image map corresponding to a frame, and each image map includes a link to a URL location that corresponds to the selected feature; and display means for causing display of data of the URL location based on the link.

2. The system of claim 1 wherein said image map file is compressed.

3. The system of claim 2 further comprising decompression means for decompressing said compressed image map file.

4. The system of claim 1 wherein the selected feature includes layering information of the dynamic video image.

5. A system for displaying dynamic video images, comprising:

means for receiving an indication of a selection of a feature of a frame of a dynamic video image;

a frame file having a plurality of locations, each frame location for storing individual frames of said dynamic video image wherein said each frame includes said feature; and an image map file having a plurality of image map locations;

wherein said each image map location stores an image map corresponding to said individual frames, and wherein said image map corresponding to said individual frames includes said link.

6. The system of claim 5 wherein said image map file is compressed.

7. The system of claim 6 further comprising decompressing means for decompressing said compressed image map file.

8. The system of claim 5 wherein the selected feature includes layering information of the dynamic video image.

9. An apparatus for integrating a video program for use in web browser applications, comprising:

selecting means for selecting a feature of a frame of a dynamic image in a video program;

correlating means for correlating said feature to a URL; and display means for displaying information corresponding to the URL;

wherein said correlating means includes a frame file having a plurality of frame locations, each frame location for storing a respective one of the frames of said dynamic image, and an image map file having a plurality of image maps each image map corresponding to a respective stored frame containing the feature and each image map including a link to said URL location corresponding to the selected feature.

10. The apparatus of claim 9 further comprising a frame storage unit for storing said frame file.

11. The apparatus of claim 10 further including an image map storage unit for storing said image maps corresponding to the frames, wherein the image maps include said URL and the display means causes display responsive to the URL in an image map corresponding to a frame, said feature of said dynamic image in said each frame.

12. The apparatus of claim 9 further comprising generating means for generating said URL.

13. The apparatus of claim 9 wherein said image map file is compressed.

14. The apparatus of claim 13 further including decompression means for decompressing said compressed image map file.

15. The apparatus of claim 9 further including means for receiving a video program including said dynamic video image.

16. A method of integrating a video program for use in web browser applications, said method comprising the steps of:

selecting a feature of a frame of a dynamic video image;

storing, in each of a plurality of frame locations of a frame file, one of the frames of said dynamic video image, wherein each individual frame includes the selected feature;

storing an image map in each of a plurality of image map locations of an image map file, said image map corresponding to a frame, and each image map including a link to a URL location corresponding to the selected feature; and displaying data of the URL location based on the link.

17. The method of claim 16 wherein said step of storing an image map includes compressing said image map file.

18. The method of claim 17 further including the step of decompressing said image map file.

19. A method of integrating a video program for use in web browser applications, said method comprising the steps of:

receiving an indication of a selection of a feature of a frame of a dynamic video image;

storing individual frames of said dynamic video image in each of a plurality of frame locations of a frame file wherein said each frame includes said feature; and storing an image map corresponding to each of said individual frames in each of a plurality of image map locations in an image map file, said image map corresponding to said individual frames including said link.

20. The method of claim 19 wherein said step of storing an image map includes compressing said image map file.

21. The method of claim 20 further including the step of decompressing said compressed image map file.

22. The method of claim 19 wherein the selected feature includes layering information of the dynamic video image.

* * * * *